United States Patent
Jung et al.

(10) Patent No.: US 11,225,197 B2
(45) Date of Patent: Jan. 18, 2022

(54) ROOF RACK FOR VEHICLE

(71) Applicant: LG Hausys, Ltd., Seoul (KR)

(72) Inventors: Yong-Woo Jung, Seoul (KR); Sang-Gil Park, Seoul (KR); Jung-Sik Lee, Seoul (KR); Yong-Kil Kil, Seoul (KR)

(73) Assignee: LG HAUSYS, LTD., Seoul (KR)

( * ) Notice: Subject to any disclaimer, the term of this patent is extended or adjusted under 35 U.S.C. 154(b) by 19 days.

(21) Appl. No.: 16/652,354

(22) PCT Filed: Oct. 1, 2018

(86) PCT No.: PCT/KR2018/011629
§ 371 (c)(1),
(2) Date: Mar. 30, 2020

(87) PCT Pub. No.: WO2019/066611
PCT Pub. Date: Apr. 4, 2019

(65) Prior Publication Data
US 2020/0298766 A1    Sep. 24, 2020

(51) Int. Cl.
*B60R 9/04* (2006.01)
(52) U.S. Cl.
CPC ..................... *B60R 9/04* (2013.01)
(58) Field of Classification Search
CPC .................... B60R 9/04; B60R 9/52
See application file for complete search history.

(56) References Cited

U.S. PATENT DOCUMENTS

| | | | |
|---|---|---|---|
| 9,248,864 B2 * | 2/2016 | Eberle | B62D 25/06 |
| 2005/0236342 A1 * | 10/2005 | Jeong | B60R 9/04 |
| | | | 211/20 |

FOREIGN PATENT DOCUMENTS

| | | |
|---|---|---|
| DE | 102007019617 A1 | 10/2008 |
| EP | 0628452 B1 | 7/1996 |
| JP | 07-232597 A | 9/1995 |
| JP | 2000-280830 A | 10/2000 |
| KR | 20-0149774 Y1 | 6/1999 |
| KR | 20-0345782 Y1 | 3/2004 |
| KR | 10-2009-0095131 A | 9/2009 |
| KR | 10-2015-0085577 A | 7/2015 |
| KR | 10-2016-0117650 A | 10/2016 |

OTHER PUBLICATIONS

Korean Office Action dated Apr. 14, 2020, in connection with the Korean Patent Application No. 10-2017-0126790.
German Office Action dated Jan. 18, 2021, in connection with the German Patent Application No. 11-2018-004-334.7.
International Search Report dated Jan. 23, 2019 for corresponding international application No. PCT/KR2018/011629.

* cited by examiner

*Primary Examiner* — Corey N Skurdal
(74) *Attorney, Agent, or Firm* — Hauptman Ham, LLP

(57) ABSTRACT

A roof rack for a vehicle according an embodiment of the present invention comprises roof rails, and coupling members for attaching the roof rails to the body of a vehicle, wherein each roof rail has a hollow groove extending in the lengthwise direction, the bottom of the roof rail is open in the direction of attachment to the body due to the hollow groove, the open bottom part of the roof rail is provided with coupling member attachment parts, the coupling member attachment parts connect side walls formed due to the hollow groove, and the coupling members couple with the coupling member attachment parts.

8 Claims, 4 Drawing Sheets

ROOF RACK FOR VEHICLE

CROSS-REFERENCE TO RELATED APPLICATION

The present application is a national stage filing under 35 U.S.C § 371 of PCT application number PCT/KR2018/011629 filed on Oct. 1, 2018 which is based upon and claims the benefit of priority to Korean Patent Application No. 10-2017-0126790, filed on Sep. 29, 2017 in the Korean Intellectual Property Office, which are incorporated herein in their entireties by reference.

TECHNICAL FIELD

The present disclosure relates to a roof rack for a vehicle. More specifically, the present disclosure relates to a roof rack for a vehicle in which a fastener receiving portion is formed at a bottom of the roof rail having a hollow groove defined therein, and a fastener for fastening the roof rail to a vehicle body is received in and coupled to the fastener receiving portion such that the fastener for coupling the roof rack to the vehicle body is not exposed to an outside, thereby improving appearance quality of the roof rack, and improving a life span and durability of the roof rack.

BACKGROUND

In general, transport of cargo using a vehicle is carried out using a trunk of the vehicle. However, a bulky cargo or long cargo may not be transported using a trunk space but may be transported using a roof rack.

Moreover, the roof rack is fixed to a roof panel as a roof of the vehicle. A relatively bulky cargo such as camping equipment or leisure equipment such as skiing is loaded onto the roof rack. Nowadays, popularization of a vehicle for leisure (SUV; Sport Utility Vehicle, RV; recreational vehicle) and camping boom allow the roof rack to be widely used.

However, a roof rack according to a prior art is manufactured by high temperature extrusion molding of plastic for weight reduction, and thus is mounted on a vehicle. In this connection, there is a problem that a coupling portion of the roof rack with a vehicle body is not rigid, and appearance quality thereof is degraded as a coupling portion is exposed to an outside.

DISCLOSURE

Technical Purpose

One purpose of the present disclosure is to provide a roof rack for a vehicle in which a fastener receiving portion is formed at a bottom of the roof rail having a hollow groove defined therein, and a fastener for fastening the roof rail to a vehicle body is received in and coupled to the fastener receiving portion such that the fastener for coupling the roof rack to the vehicle body is not exposed to an outside, thereby improving appearance quality of the roof rack, and improving a life span and durability of the roof rack.

Another purpose of the present disclosure is to provide a roof rack for a vehicle in which a roof rail is formed using a plastic material, and a fastener receiving portion is formed at an open bottom, such that the fastener receiving portion prevents the roof rail from shrinking, thereby to prevent an appearance quality defect of the roof rack.

Technical Solution

A first aspect of the present disclosure provides a roof rack for a vehicle, the roof rack comprising a roof rail and a fastener for coupling the roof rail to a vehicle body, wherein the roof rail has a hollow groove defined therein to extending in a longitudinal direction thereof, wherein a bottom of the roof rail is open and communicates with the hollow groove, wherein the bottom of the roof rail is coupled to the vehicle body, wherein the roof rail includes: a fastener receiving portion formed at the open bottom of the roof rail; and both side walls defining the hollow groove therebetween, wherein the fastener receiving portion connects the both side walls to each other, wherein the fastener is received in and coupled to the fastener receiving portion.

In one implementation of the first aspect, the fastener receiving portion includes a plurality of fastener receiving portions spacedly arranged at an equal spacing in the longitudinal direction, wherein each of the plurality of fastener receiving portions partially covers the hollow groove.

In one implementation of the first aspect, the roof rail further includes a reinforcing rib formed in the hollow groove, wherein the reinforcing rib includes: a horizontal rib connecting the both side walls with each other; and a vertical rib connecting the horizontal rib and the fastener receiving portion with each other.

In one implementation of the first aspect, the fastener receiving portion includes a fastener support and a fastener receiving groove, wherein the fastener is inserted into the fastener receiving groove, and the fastener support is coupled with the fastener inserted into the fastener receiving groove.

In one implementation of the first aspect, the fastener is embodied as a rivet bolt or a rivet nut.

A second aspect of the present disclosure provides a roof rack for a vehicle, the roof rack comprising a roof rail and a fastener for coupling the roof rail to a vehicle body, wherein the roof rail has a hollow groove defined therein to extending in a longitudinal direction thereof, wherein a bottom of the roof rail is open and communicates with the hollow groove, wherein the bottom of the roof rail is coupled to the vehicle body, wherein the roof rail includes: a fastener receiving portion formed at the open bottom of the roof rail; and both side walls defining the hollow groove therebetween, wherein the fastener receiving portion connects the both side walls to each other, wherein the fastener is received in and coupled to the fastener receiving portion in an insert injection molding manner.

In one implementation of the second aspect, the fastener receiving portion includes a plurality of fastener receiving portions spacedly arranged at an equal spacing in the longitudinal direction, wherein each of the plurality of fastener receiving portions partially covers the hollow groove.

In one implementation of the second aspect, the roof rail further includes a reinforcing rib formed in the hollow groove, wherein the reinforcing rib includes: a horizontal rib connecting the both side walls with each other; and a vertical rib connecting the horizontal rib and the fastener receiving portion with each other.

In one implementation of the second aspect, the vertical ribs include a first vertical rib and a second vertical rib extending in parallel to each other, wherein a spacing between the first vertical rib and one side wall of the both side walls is equal to a spacing between the second vertical rib and the other side wall thereof.

In one implementation of the second aspect, a thickness of each of the horizontal rib and the vertical rib is in a range of 0.5 mm to 10 mm.

In one implementation of the second aspect, the fastener is embodied as a rivet bolt or a rivet nut.

Specific details of other embodiments are included in the detailed description and the drawings.

Technical Effect

In accordance with the present disclosure, the fastener receiving portion is formed at a bottom of the roof rail having the hollow groove defined therein, and the fastener for fastening the roof rail to the vehicle body is received in and coupled to the fastener receiving portion such that the fastener for coupling the roof rack to the vehicle body is not exposed to an outside, thereby improving appearance quality of the roof rack, and improving a life span and durability of the roof rack. Further, the fastener receiving portion is formed at an open bottom, such that the fastener receiving portion prevents the roof rail from shrinking or deforming, thereby to prevent an appearance quality defect of the roof rack.

It will be fully understood that embodiments of technical spirit of the present disclosure may provide various effects as not specifically mentioned.

DETAILED DESCRIPTIONS

Advantages and features of the present disclosure, and methods of achieving them will be apparent with reference to embodiments as described below in detail in conjunction with the accompanying drawings. However, the present disclosure is not limited to the embodiments described herein and may be embodied in other forms. Rather, the embodiments introduced herein are provided to further convey the spirit of the present disclosure to those skilled in the art so that the disclosed contents may be thoroughly and completely understood by the skilled person to the art.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in detail with reference to the accompanying drawings.

Figure 1:
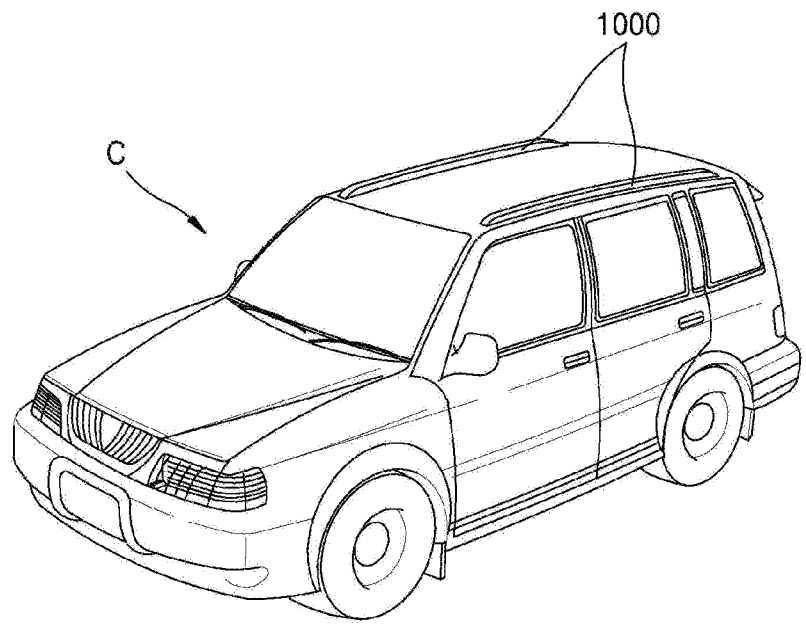
FIG. 1 is a schematic diagram showing a vehicle equipped with a roof rack according to an embodiment of the present disclosure.

FIG. 1 is a schematic diagram showing a vehicle equipped with a roof rack according to an embodiment of the present disclosure.

As shown, a roof rack 1000 extending in a direction between front and rear wheels is mounted on a top of a body of a vehicle C.

Moreover, the roof rack 1000 has a fastener to fasten the rack to the vehicle body of the vehicle C such that the fastener is not exposed to an outside. Thus, not only the appearance quality of the rack is improved, but also the lifespan and durability of the fastener may be improved.

Further, a roof rail (1100 in FIG. 2) of the roof rack 1000 may be made of engineering plastic such as PP, PA6, ABS, PP+EPDM and PC+ABS. Further, the roof rail 1100 may be made of fiber reinforced plastic in consideration of light weight and durability.

Moreover, the fiber reinforced plastic is obtained by adding reinforcing fibers to a base resin. The base resin may include polyester resins, polyamide resins, nylon resins, and the like. Carbon fibers and/or glass fibers may be used as the reinforcing fibers.

Moreover, the fiber reinforced plastic may include glass fiber reinforced plastics, carbon fiber reinforced plastics, continuous fiber reinforced plastics, continuous glass fiber reinforced plastics, continuous carbon fiber reinforced plastics, short fiber reinforced plastics, short glass fiber reinforced plastic, short carbon fiber reinforced plastic, long fiber reinforced plastic, long glass fiber reinforced plastic, short glass fiber reinforced plastic and the like.

Hereinafter, detailed shape and configuration of the roof rack will be described in more detail with reference to FIGS. 2 to 4.

Figure 2:
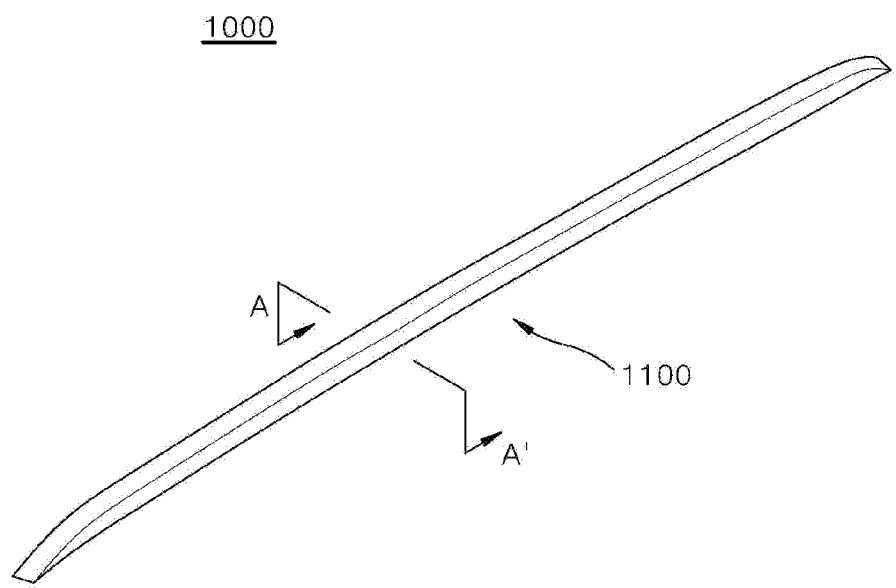
FIG. 2 is a schematic perspective view of a roof rack according to a first embodiment of the present disclosure.
Figure 3:
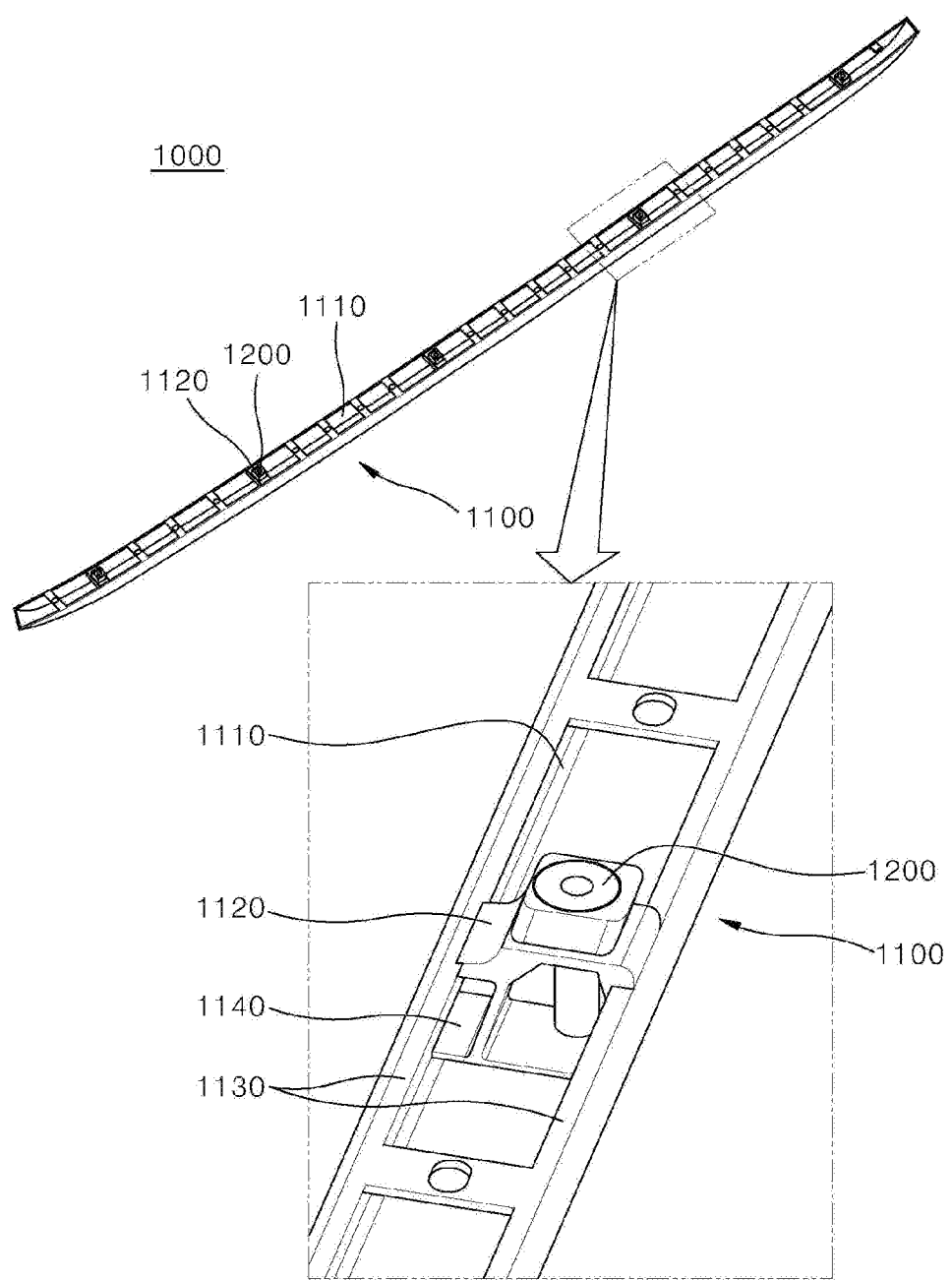
FIG. 3 is a schematic bottom perspective view of the roof rack shown in FIG. 2.

FIG. 2 is a schematic perspective view of a roof rack according to a first embodiment of the present disclosure. FIG. 3 is a schematic bottom perspective view of the roof rack shown in FIG. 2. FIG. 4 is a schematic exploded cross-sectional view of the roof rack shown in FIG. 2 taken in a line A-A'.

As shown, the roof rack 1000 includes the roof rail 1100 and a fastener 1200. Moreover, the roof rail 1100 has a hollow groove 1110 defined therein, a fastener receiving portion 1120, both side walls 1130 and a reinforcing rib 1140.

More specifically, the hollow groove 1110 extends in a longitudinal direction of the roof rail 1100. Furthermore, the roof rail 1100 has an open bottom communicating with the hollow groove 1110. The roof rack is mounted, at the bottom thereof, onto the vehicle body.

That is, the roof rail 1100 has the both side walls 1130 defining the hollow groove 1110 therebetween when the roof rail 1100 is viewed in a cross-sectional manner.

Moreover, the hollow groove 1110 may be formed in the roof rail using a slide core mold.

Further, the fastener receiving portion 1120 is constructed to receive the fastener 1200 for fastening the roof rack to the vehicle body. The fastener receiving portion 1120 is formed at the open bottom of the roof rail 1100.

That is, the fastener receiving portion 1120 is constructed to connect the both side walls 1130 of the roof rail 1100 defining the hollow groove 1110 therebetween to each other.

Accordingly, when the fastener receiving portion 1120 is not formed, the roof rail shrinks naturally in a cooling process after injection molding at high temperature in order to manufacture the roof rail. Thus, bending of the roof rail may occur due to contraction thereof. However, in accordance with the present disclosure, the fastener receiving portion 1120 supports the both side walls 1130 ion the cooling process, thereby preventing the roof rail from warping or deformation.

Moreover, a plurality of fastener receiving portions 1120 may be arranged at equal spacings in the longitudinal direction of the roof rail 1100, so that the hollow groove 1110 is partially covered by the fastener receiving portion 1120.

Figure 4:
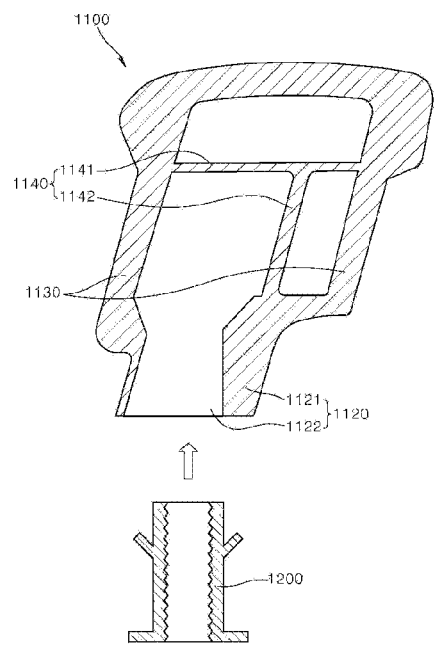
FIG. 4 is a schematic exploded cross-sectional view of the roof rack shown in FIG. 2 as taken in a line A-A'.

Further, as shown in FIG. 4, the fastener receiving portion 1120 includes a fastener support 1121 and a fastener receiving groove 1122.

Moreover, the fastener 1200 is inserted into the fastener receiving groove 1122 while the fastener 1200 is coupled with the fastener support 1121.

Further, the reinforcing rib 1140 is constructed to compensate for a loss of durability of the roof rail 1100 which may occur due to the formation of the hollow groove 1110. The reinforcing rib 1140 is formed in the hollow groove 1110.

Moreover, the reinforcing rib 1140 includes a horizontal rib 1141 connecting the both side walls 1130 with each other and a vertical rib 1142 connecting the horizontal rib 1141 and the fastener receiving portion 1120 with each other.

That is, the horizontal rib 1141 is formed in the hollow groove 1110 to connect the both side walls 1130 with each other. The vertical rib 1142 is formed in the groove 1110 such that one end of the vertical rib is connected to the horizontal rib 1141 and the other end thereof is connected to the fastener receiving portion 1120.

Further, a thickness of each of the horizontal rib 1141 and the vertical rib 1142 may be in a range of 0.5 mm to 10 mm.

Further, FIG. 4 shows an example where the fastener 1200 is implemented as a rivet nut. As shown by an arrow in FIG. 4, the rivet nut as the fastener 1200 is inserted into the fastener receiving groove 1122.

Moreover, the vehicle body is equipped with a coupling member coupled with the fastener 1200. The fastener 1200 of the roof rack 1000 according to the first embodiment of the present disclosure is embodied as a rivet nut. Thus, a rivet bolt (not shown) is mounted on the vehicle body. As the fastener 1200 is coupled to the rivet bolt, the roof rack 1000 is coupled to the vehicle C.

As described above, the fastener receiving portion 1120 of the roof rack according to the first embodiment of the present disclosure receives the fastener therein such that the roof rack is coupled to the vehicle body. Further, the fastener receiving portion 1120 of the roof rack according to the first embodiment of the present disclosure simultaneously performs a function of preventing the appearance deformation such as warpage that may occur in the forming process of the roof rack.

Figure 5:
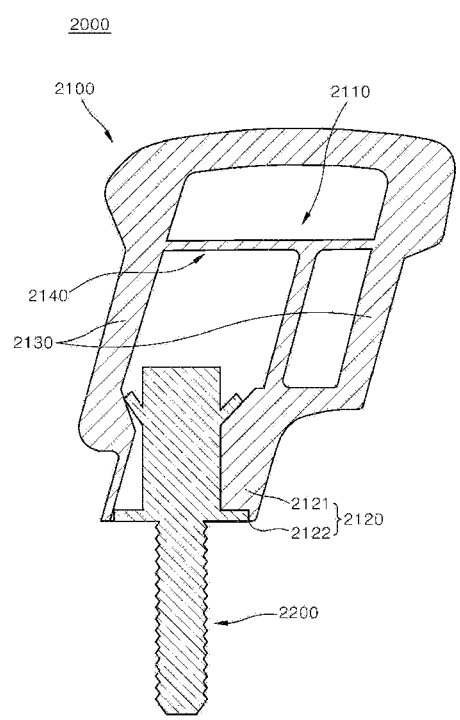
FIG. 5 is a schematic cross-sectional view of a roof rack according to a second embodiment of the present disclosure.

FIG. 5 is a schematic cross-sectional view of a roof rack according to a second embodiment of the present disclosure.

As shown, a roof rack 2000 in accordance with the second embodiment is different from the roof rack 1000 according to the first embodiment only in terms of a fastener.

More specifically, the roof rack 2000 includes a roof rail 2100 and a fastener 2200. The roof rail 2100 has a hollow groove 2110, a fastener receiving portion 2120, both side walls 2130 and a reinforcing rib 2140.

Further, the roof rail 2100 is the same as the roof rail 1100 of the roof rack 1000 according to the first embodiment, and a detailed description thereof will be omitted.

Moreover, unlike the fastener 1200 of the roof rack 1000 according to the first embodiment, the fastener 2200 is embodied as a rivet bolt.

Moreover, the vehicle body of the vehicle is equipped with a coupling member to be coupled with the fastener 2200. The fastener 2200 of the roof rack 2000 according to the second embodiment of the present disclosure is embodied as the rivet bolt. Thus, the vehicle body is equipped with a rivet nut (not shown). The roof rack 2000 is coupled to the vehicle C while the fastener 2200 is coupled with the rivet nut.

Figure 6:
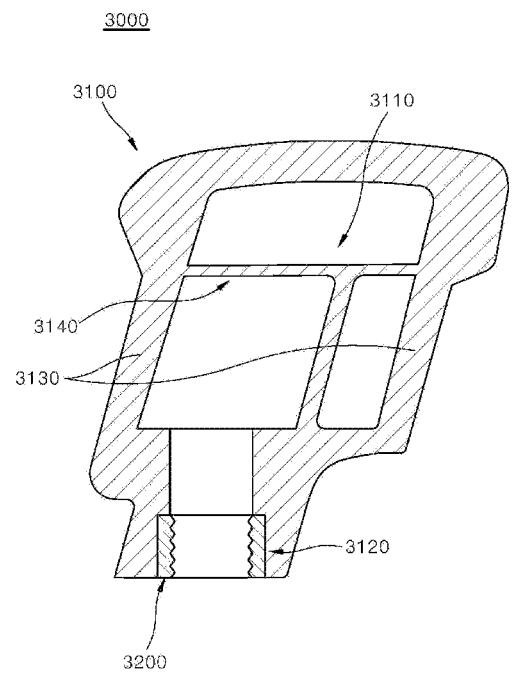
FIG. 6 is a schematic cross-sectional view of a roof rack according to a third embodiment of the present disclosure.

FIG. 6 is a schematic cross-sectional view of a roof rack according to a third embodiment of the present disclosure.

As shown, a roof rack 3000 in accordance with the third embodiment is different from the roof rack 1000 according to the first embodiment in terms of the fastener and a fastener coupling scheme.

More specifically, the roof rack 3000 includes a roof rail 3100 and a fastener 3200. The roof rail 3100 has a hollow groove 3110, a fastener receiving portion 3120, both side walls 3130 and a reinforcing rib 3140.

Further, the roof rail 3100 is the same as the roof rail 1100 of the roof rack 1000 according to the first embodiment, and a detailed description thereof will be omitted.

Moreover, the fastener 3200 is embodied of a general nut unlike the fastener 1200 of the roof rack 1000 according to the first embodiment.

Moreover, the fastener 3200 is received into and coupled to the fastener receiving portion 3120 of the roof rack 3000 in an insert injection molding manner.

Moreover, the vehicle body of the vehicle is equipped with a coupling member to be coupled with the fastener 3200. The fastener 3200 of the roof rack 3000 according to the third embodiment of the present disclosure is embodied as a nut. Thus, the body of the vehicle is provided with a bolt (not shown). The roof rack 3000 is coupled to the vehicle C while the nut as the fastener 3200 is coupled to the bolt.

Figure 7:
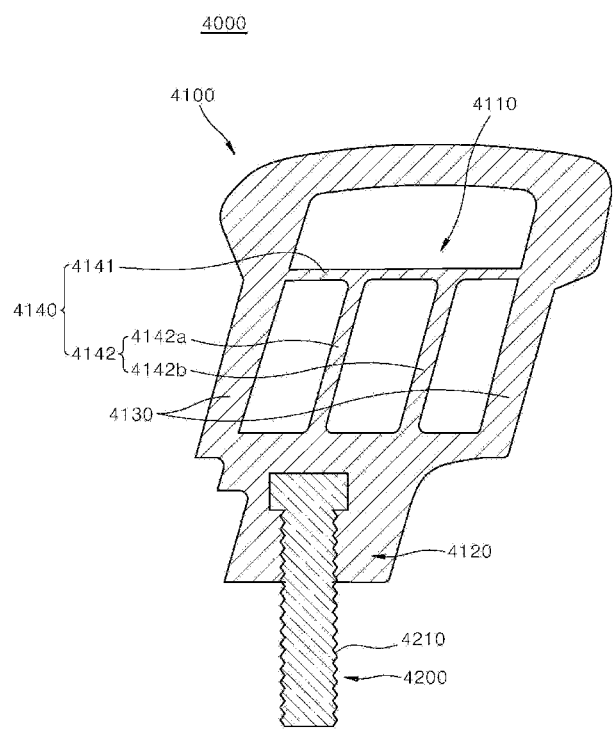
FIG. 7 is a schematic cross-sectional view of a roof rack according to a fourth embodiment of the present disclosure.

FIG. 7 is a schematic cross-sectional view of a roof rack according to a fourth embodiment of the present disclosure.

As shown, a roof rack 4000 in accordance with the fourth embodiment is different from the roof rack 3000 according to the third embodiment in terms of only shapes of the fastener and the reinforcing rib.

More specifically, the roof rack 4000 includes a roof rail 4100 and a fastener 4200. The roof rail 4100 has a hollow groove 4110, a fastener receiving portion 4120, both side walls 4130 and a reinforcing rib 4140.

Further, the reinforcing rib 4140 of the roof rail 4100 includes a horizontal rib 4141 and a vertical rib 4142.

Moreover, the horizontal rib 4141 is formed in the hollow groove 4110 to connect the both side walls 4130 with each other. Further, the vertical rib 4142 is formed in the groove 4110 such that one end of the vertical rib is connected to the horizontal rib 4141 and the other end thereof is connected to the fastener receiving portion 4120.

Moreover, the vertical rib 4142 includes a first vertical rib 4142a and a second vertical rib 4142b in parallel with each other. A spacing between the first vertical rib 4142a and one side wall is equal to a spacing between the second vertical rib 4142b and the other side wall. Thus, the two vertical ribs may allow the roof rail 4100 to be more rigid.

Moreover, the fastener 4200 is embodied as a bolt, unlike the fastener 3200 of the roof rack 3000 according to the third embodiment.

Moreover, the fastener 4200 is received in and coupled to the fastener receiving portion 4120 of the roof rack 4000 in an insert injection molding manner.

Moreover, the vehicle body is equipped with a coupling member to be coupled with the fastener 4200. The fastener 4200 of the roof rack 4000 according to the fourth embodiment of the present disclosure is embodied as a bolt. The body of the vehicle is provided with a nut (not shown). In this way, the roof rack 4000 is coupled to the vehicle C while the bolt as the fastener 4200 is coupled to the nut.

The preferred embodiments of the present disclosure has been described with reference to the accompanying drawings. However, those skilled in the art will appreciate that the present disclosure may be embodied in other specific forms without changing technical spirit or essential characteristics thereof. Therefore, it should be understood that one embodiment described above is illustrative in all respects and not restrictive.

What is claimed is:

1. A roof rack for a vehicle, the roof rack comprising a roof rail and a fastener for coupling the roof rail to a vehicle body,
   wherein the roof rail has a hollow groove defined therein extending in a longitudinal direction thereof, wherein a bottom of the roof rail is open and communicates with the hollow groove, wherein the bottom of the roof rail is coupled to the vehicle body,
   wherein the roof rail includes:
      a fastener receiving portion formed at the open bottom of the roof rail; and
      both side walls defining the hollow groove therebetween,
   wherein the fastener receiving portion connects the both side walls to each other,
   wherein the fastener is received in and coupled to the fastener receiving portion,
   wherein the roof rail further includes a reinforcing rib formed in the hollow groove,
   wherein the reinforcing rib includes:
      a horizontal rib connecting the both side walls with each other; and
      a vertical rib connecting the horizontal rib and the fastener receiving portion with each other,
   wherein the vertical ribs include a first vertical rib and a second vertical rib extending in parallel to each other,
   wherein a spacing between the first vertical rib and one side wall of the both side walls is equal to a spacing between the second vertical rib and the other side wall thereof.

2. The roof rack of claim 1, wherein the fastener receiving portion includes a plurality of fastener receiving portions spacedly arranged at an equal spacing in the longitudinal direction, wherein each of the plurality of fastener receiving portions partially covers the hollow groove.

3. The roof rack of claim 1, wherein the fastener receiving portion includes a fastener support and a fastener receiving groove,
   wherein the fastener is inserted into the fastener receiving groove, and the fastener support is coupled with the fastener inserted into the fastener receiving groove.

4. The roof rack of claim 1, wherein the fastener is embodied as a rivet bolt or a rivet nut.

5. A roof rack for a vehicle, the roof rack comprising a roof rail and a fastener for coupling the roof rail to a vehicle body,
   wherein the roof rail has a hollow groove defined therein extending in a longitudinal direction thereof, wherein a bottom of the roof rail is open and communicates with the hollow groove, wherein the bottom of the roof rail is coupled to the vehicle body,
   wherein the roof rail includes:
      a fastener receiving portion formed at the open bottom of the roof rail; and
      both side walls defining the hollow groove therebetween,
   wherein the fastener receiving portion connects the both side walls to each other,
   wherein the fastener is received in and coupled to the fastener receiving portion in an insert injection molding manner,
   wherein the roof rail further includes a reinforcing rib formed in the hollow groove,
   wherein the reinforcing rib includes:
      a horizontal rib connecting the both side walls with each other; and
      a vertical rib connecting the horizontal rib and the fastener receiving portion with each other,
   wherein the vertical ribs include a first vertical rib and a second vertical rib extending in parallel to each other,
   wherein a spacing between the first vertical rib and one side wall of the both side walls is equal to a spacing between the second vertical rib and the other side wall thereof.

6. The roof rack of claim 5, wherein the fastener receiving portion includes a plurality of fastener receiving portions spacedly arranged at an equal spacing in the longitudinal direction, wherein each of the plurality of fastener receiving portions partially covers the hollow groove.

7. The roof rack of claim 5, wherein a thickness of each of the horizontal rib and the vertical rib is in a range of 0.5 mm to 10 mm.

8. The roof rack of claim 5, wherein the fastener is embodied as a rivet bolt or a rivet nut.

* * * * *